(12) United States Patent
Kim et al.

(10) Patent No.: US 7,565,669 B2
(45) Date of Patent: Jul. 21, 2009

(54) OPTICAL DISC DRIVE WITH OPTICAL DISK HEATING MEMBER

(75) Inventors: Jong-Man Kim, Seoul (KR); Hyo-Kune Hwang, Gyeonggi-Do (KR); Byung-Ju Dan, Gyeonggi-Do (KR); Nam-Woong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 505 days.

(21) Appl. No.: 10/956,633

(22) Filed: Sep. 30, 2004

(65) Prior Publication Data

US 2005/0071860 A1 Mar. 31, 2005

(30) Foreign Application Priority Data

Sep. 30, 2003 (KR) .................. 10-2003-0067989

(51) Int. Cl.
*G11B 17/028* (2006.01)
*G11B 33/14* (2006.01)

(52) U.S. Cl. ...................... 720/695; 720/648

(58) Field of Classification Search ............... 720/695, 720/696, 703, 648; 360/97.02
See application file for complete search history.

(56) References Cited

U.S. PATENT DOCUMENTS

| | | | | |
|---|---|---|---|---|
| 5,051,975 A | * | 9/1991 | Tadokoro et al. | 369/44.39 |
| 6,212,030 B1 | * | 4/2001 | Koriyama et al. | 360/98.08 |
| 6,400,522 B1 | * | 6/2002 | Milligan | 360/69 |
| 6,532,335 B2 | * | 3/2003 | Otomo et al. | 386/95 |
| 6,680,896 B2 | * | 1/2004 | Shiwa | 720/695 |
| 6,735,035 B1 | * | 5/2004 | Smith et al. | 360/69 |
| 7,035,031 B2 | * | 4/2006 | Kim et al. | 360/69 |
| 2001/0043550 A1 | * | 11/2001 | Kim et al. | 369/126 |
| 2003/0202274 A1 | * | 10/2003 | Onda et al. | 360/69 |
| 2007/0283375 A1 | * | 12/2007 | Miyake et al. | 720/695 |

FOREIGN PATENT DOCUMENTS

| EP | 496485 A | * | 7/1992 |
|---|---|---|---|
| JP | 2000339918 A | * | 12/2000 |
| KR | 2001-91302 | | 10/2001 |
| KR | 10-0419211 | | 2/2004 |

* cited by examiner

*Primary Examiner*—Brian E Miller
(74) *Attorney, Agent, or Firm*—Lee, Hong, Degerman, Kang & Waimey

(57) ABSTRACT

An optical disc drive include a turntable for mounting an optical disc, a driving unit rotating the turntable, and an optical disc heating member for heating a center portion of the optical disc. In the optical disc drive, an inner circumference temperature of the optical disc is maintained to be higher than a peripheral temperature of the optical disc by at least 50° C. According to this, a growth of a crack generated at a periphery of a hole of the optical disc is restrained thereby to effectively prevent a damage of the optical disc.

9 Claims, 7 Drawing Sheets

(a)

OPTICAL DISC DRIVE WITH OPTICAL DISK HEATING MEMBER

Pursuant to 35 U.S.C. § 119(a), this non-provisional patent application claims the priority benefit of Korean Patent Application No. 10-2003-0067989, filed on Sep. 30, 2003, the entire contents of which are hereby incorporated by reference.

BACKGROUND OF THE INVENTION

1. Field of the Invention

The present invention relates to an optical disc drive, and more particularly, to an optical disc drive capable of effectively preventing a damage of an optical disc by restraining a growth of a crack generated at an inner circumferential region of the optical disc.

2. Description of the Conventional Art

Generally, a compact disc for recording data including an audio signal or a video signal by a digital recording method, and a digital versatile disc having an increased recording capacity and using a red semiconductor laser of a short wavelength are called as an optical disc.

FIG. 1 is a plane view showing a general optical disc, and FIGS. 2A to 2C are views showing a growth process of a crack generated at an inner circumferential region of the optical disc.

As shown, a general optical disc 10 includes: a hole 10a formed at the center thereof; an inner circumferential region 11 formed at a circumference of the hole 10a and having no recording film; and an outer circumferential region 12 formed at a circumference of the inner circumferential region 11.

A crack generated at the inner circumferential region of the optical disc is caused by a user's carelessness, or is caused as a material of the optical disc is composed of polycarbonate, an amorphous material.

The optical disc formed of the polycarbonate, an amorphous material is damaged when even a stress corresponding to $1/10$ of a yield stress is continuously applied thereto at an ordinary temperature.

Generally, the optical disc is damaged by a following process. At the time of fabricating the optical disc or dealing with the optical disc by a user, a minute scratch is generated as a crack at the periphery of the hole of the optical disc. The scratch is gradually increased by a craze phenomenon thereby to damage the optical disc.

The craze phenomenon is a phenomenon that a chain structure inside the amorphous material is gradually cut to be destroyed and thereby a crack gradually grows.

That is, the amorphous material such as polycarbonate has a chain structure. As shown in FIG. 2, when a minute crack of a sub-micron unit is initially generated, the chain structure is gradually scattered. Under this state, when a static fatigue is applied to the amorphous material, a distance of each molecule is drastically increased from 'd' of FIG. 2A to 'le' of FIG. 2B thereby to destroy a bonding state between molecules and to generate a void space between the craze and the molecule more and more. Under this state, when the static fatigue is continuously applied to the amorphous material, the chain structure is cut as shown in FIG. 2C and the crack gradually grows thereby to damage the amorphous material. This phenomenon is called as a craze phenomenon.

The reference signal a of FIGS. 2A to 2C signifies a size and a direction of a stress, which shows that the crack size is increased as the craze phenomenon becomes severe when a load more than a certain degree is constantly applied.

In the optical disc fast rotated in the optical disc drive, a minute scratch generated at the periphery of the hole develops as a crack by the aforementioned craze phenomenon, and the crack gradually grows thereby to damage the optical disc. According to this, information stored in the optical disc is lost and the optical disc drive itself is also damaged.

As a recent optical disc drive, a 52-speed recording reproducing apparatus operated at least 10,000 rpm is generally used. As a DVD speed is constantly increased, the damage of the optical disc due to the high-speed of the optical disc drive has to be prevented. In case of the 52-speed optical disc drive, the damage of the optical disc is generated.

As one embodiment of the conventional art for preventing a damage of an optical disc, there is a disc type recording medium disclosed in Korean Open-Laid Publication Patent No. 2002-0049733.

According to the disc type recording medium disclosed in Korean Open-Laid Publication Patent No. 2002-0049733, a ring type protrusion portion is formed at the periphery of the hole of the optical disc in order to prevent a crack growth when the optical disc is rotated. However, a width and a height of the protrusion portion are limited according to a size of a space inside the optical disc drive.

As another embodiment of the conventional art for preventing a damage of an optical disc, there is a structure for preventing a damage of a compact disc disclosed in Korean Open-Laid Publication Patent No. 2001-0091302.

According to the structure for preventing a damage of a disc type recording medium disclosed in Korean Open-Laid Publication Patent No. 2001-0091302, a metal reinforcing member of a non-magnetic substance is attached to the periphery of the hole of the optical disc. However, due to an elastic coefficient difference between the polycarbonate, the material of the optical material and the metal reinforcing member, a stress is concentrated at a contact part of the metal reinforcing member and thereby the metal reinforcing member is easily detached from the optical disc.

SUMMARY OF THE INVENTION

Therefore, an object of the present invention is to provide an optical disc drive capable of effectively preventing a damage of an optical disc by restraining a growth of a crack generated at an inner circumferential region of the optical disc by maintaining a temperature of the inner circumferential region of the optical disc to be higher than a peripheral temperature of the optical disc.

To achieve these and other advantages and in accordance with the purpose of the present invention, as embodied and broadly described herein, there is provided an optical disc drive comprising: a turntable for mounting an optical disc; a driving unit for rotating the turntable; and an optical disc heating means for heating a center portion of the optical disc.

The optical disc heating means is composed of: a heat wire portion for generating heat; a power portion for supplying a power source; and a wire portion for electrically connecting the heat wire portion and the power portion.

The optical disc heating means maintains a temperature difference between the inner circumferential region of the optical disc and the periphery of the optical disc as approximately 50° C.~70° C.

The optical disc drive of the present invention comprises: a turntable for mounting an optical disc; a driving unit for rotating the turntable; and an optical disc heating means for heating the inner circumferential region of the optical disc.

The optical disc heating means includes: a heat wire portion fixed to a lower surface of the turntable; a power portion electrode terminal installed at an upper surface of a main chassis; a rotator electrode terminal installed at a lower portion of a rotator of the driving unit to be selectively in contact with the power portion electrode terminal; and a power portion connected to the power portion electrode terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, preferred embodiments of the present invention will be explained in more detail with reference to the attached drawings.

Figure 1:
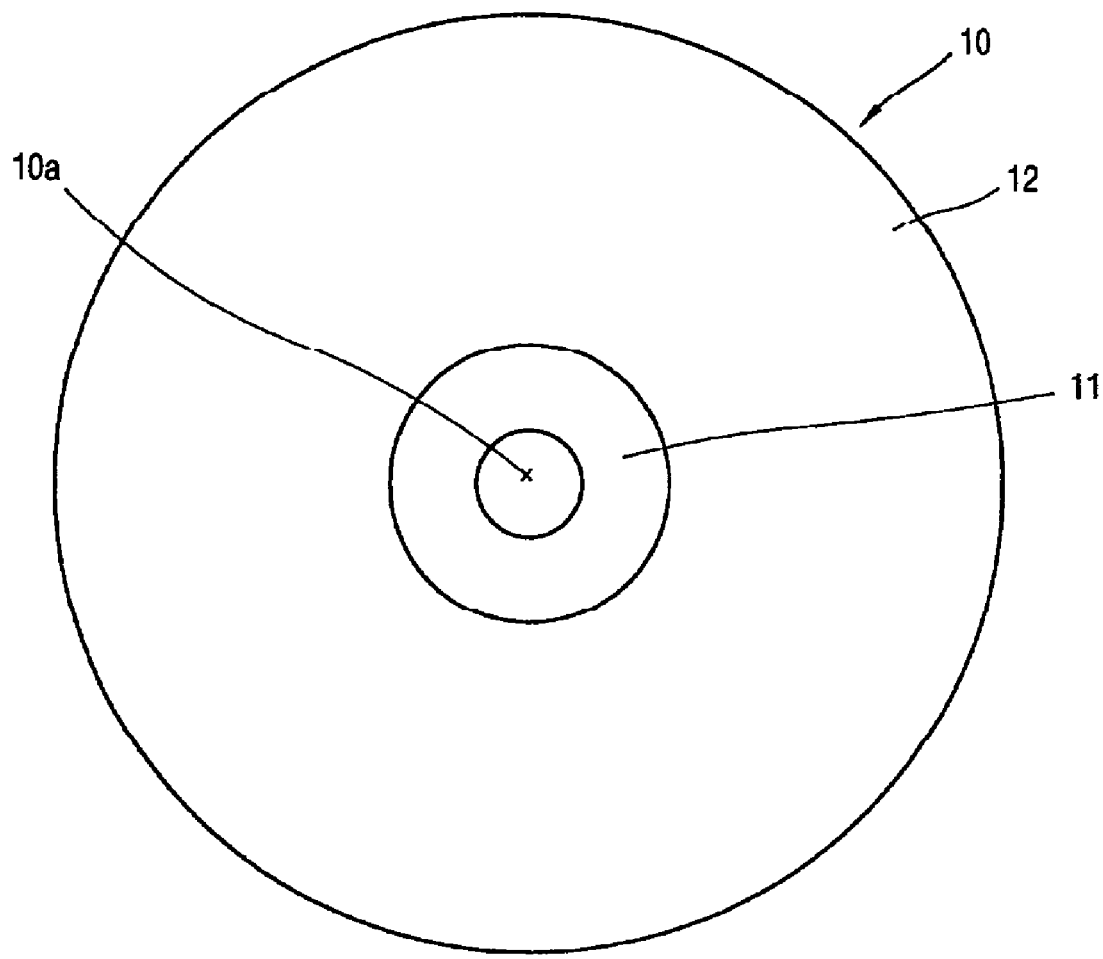
FIG. 1 is a plane view showing an optical disc in accordance with the conventional art.
Figure 2A:
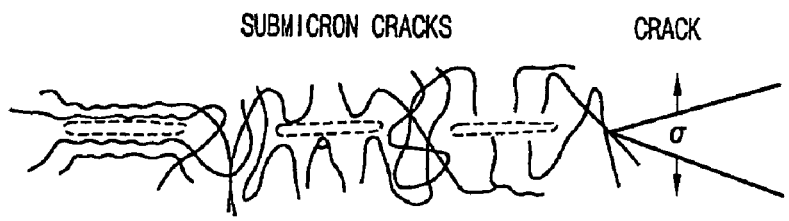
FIGS. 2A to 2C are views for explaining a growth process of a crack generated at an inner circumferential region of the optical disc.
Figure 2B:
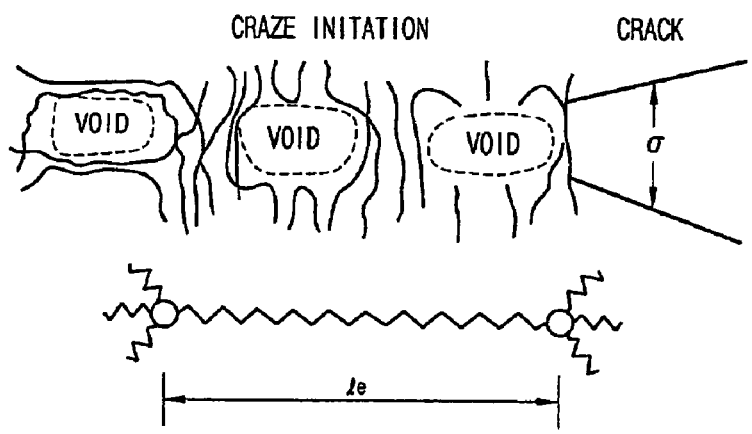
Figure 2C:
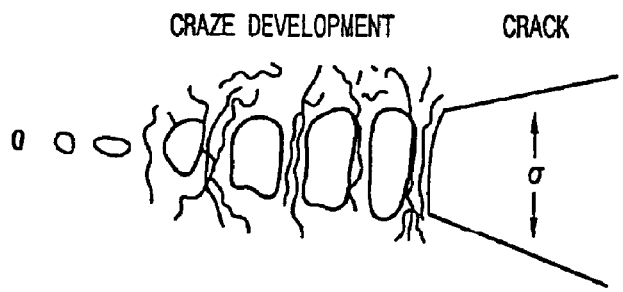
Figure 3:
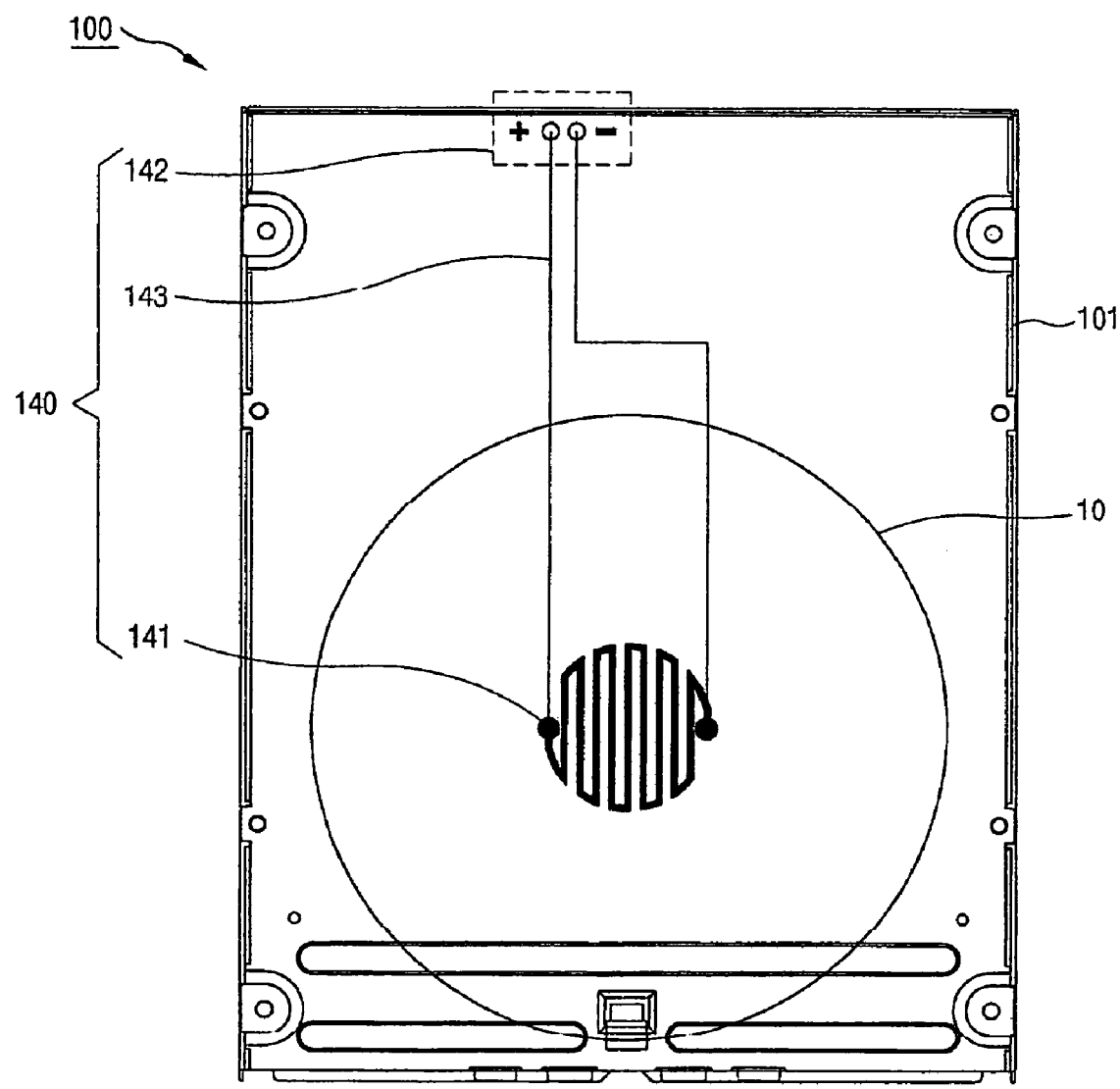
FIG. 3 is a plane view showing an optical disc drive according to one embodiment of the present invention.
Figure 4:
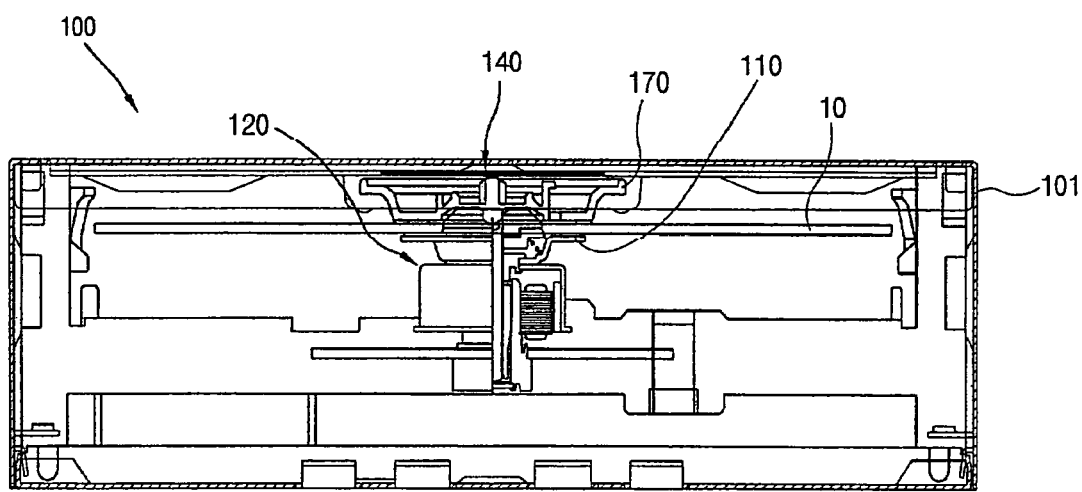
FIG. 4 is a longitudinal section view showing the optical disc drive according to one embodiment of the present invention.

FIG. 3 is a plane view showing an optical disc drive according to one embodiment of the present invention, and FIG. 4 is a longitudinal section view showing the optical disc drive according to one embodiment of the present invention.

As shown, the optical disc drive 100 according to one embodiment of the present invention comprises: a turntable 110 for mounting an optical disc 10; a driving unit 120 for rotating the turntable 110; and an optical disc heating member 140 for heating a center portion, that is, an inner circumferential region of the optical disc 10.

Generally, an optical disc has a center portion thereof, that is, an inner circumferential region thereof where a recording film is not formed. The inner circumferential region means a region less than a diameter of 34 mm from the center of the optical disc.

The disc heating member 140 is composed of: a heat wire portion 141 formed at the center of a main chassis 101; a power portion 142 installed at a rear side of the main chassis 101; and a wire portion 143 for electrically connecting the heat wire portion 141 and the power portion 142.

The heat wire portion 141 is positioned at a just lower side of the inner circumference region of the optical disc in order to heat the inner circumferential region of the optical disc.

The power portion 142 can be installed not only at the rear side of the main chassis 101 but also a lateral side or an outer side of the optical disc drive 100 although not shown.

In the optical disc drive 100 of the present invention, a stress of the inner circumferential region of the optical disc 10 is decreased by maintaining a temperature of the inner circumferential region of the optical disc 10, that is, an inner circumference temperature Ti to be higher than a peripheral temperature To by approximately 50° C.~70° C. According to this, a growth of a crack generated at the periphery of a hole 10a of the optical disc 10 can be restrained.

In the optical disc drive 100 of the present invention, a current flows to the heat wire portion 142 from the power portion 141 through the wire portion 143, and heat generated from the heat wire portion 142 heats the inner circumferential region of the optical disc 10 thereby to decrease a stress around the hole 10a of the optical disc 10. According to this, a crack growth is restrained thus to effectively prevent a damage of the optical disc 10.

Hereinafter, will be explained a principle of a crack growth of the optical disc, and a principle for restraining a crack growth of the optical disc by maintaining the inner circumference temperature of the optical disc to be higher than the peripheral temperature of the optical disc by at least 50° C.

Figure 5:
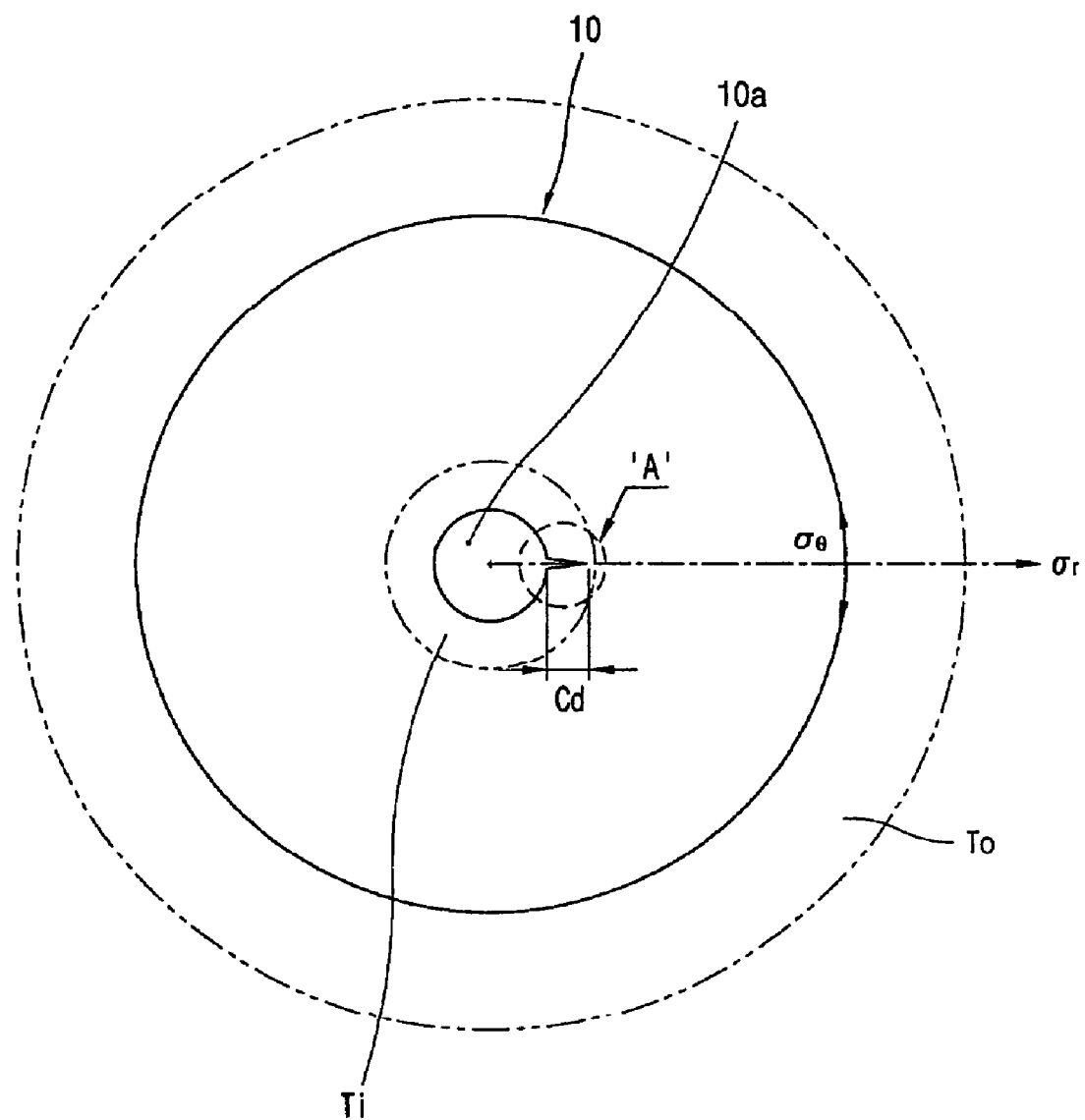
FIG. 5 is a plane view showing an optical disc having a generated crack.
Figure 6:
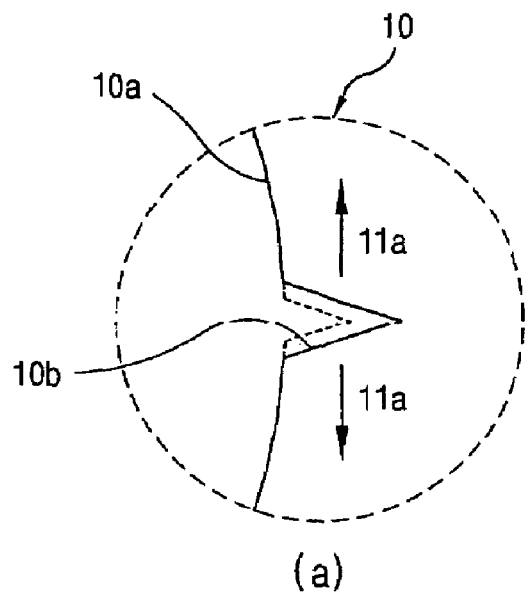
FIG. 6 is an enlargement view of 'A' part of FIG. 5 for explaining a damage principle of the optical disc.

FIG. 5 is a plane view showing an optical disc having a generated crack, and FIG. 6 is an enlargement view of 'A' part of FIG. 5 for explaining a damage principle of the optical disc.

As shown, when the optical disc 10 is fast rotated in the optical disc drive, a stress $\sigma_r$ in a radius direction and a stress $\sigma_\theta$ in a circumferential direction is adjacent to a crack growth, that is, a hoop stress are generated at the periphery of a crack 10b of the optical disc 10.

When the optical disc is fast rotated, a centrifugal force is generated towards an outside of the optical disc 10, that is, in a radius direction thereof. By the generated centrifugal force, the stress $\sigma_\theta$ shown in FIG. 5 is gradually increased to a direction that the crack 10b grows, that is, the arrow direction 11a. At this time, the hoop stress gradually enlarges the minute crack 10b formed at the periphery of the hole 10a of the optical disc 10 by a craze phenomenon.

In the optical disc drive 100 according to one embodiment of the present invention, the inner circumferential region of the optical disc 10 is heated thereby to maintain the inner circumference temperature to be higher than the peripheral temperature by approximately 50° C.~70° C. According to this, the stress $\sigma_\theta$ is gradually decreased to the opposite direction to the arrow direction 11a. According to this, a growth of the crack 10b is gradually restrained as indicated by a wavy line thereby to effectively prevent a damage of the optical disc 10.

Hereinafter, with reference to following experimental data, will be explained a principle of a growth of a crack generated at the periphery of the optical disc, and a correlation between a temperature difference (Ti–To) between the inner circumference temperature Ti of the optical disc and the peripheral temperature To of the optical disc and a hoop stress, that is, a theory that a stress generated at the periphery of the hole of the optical disc is decreased at the time of heating the inner circumferential region of the optical disc with a temperature higher than a temperature of the periphery of the optical disc.

Figure 7:
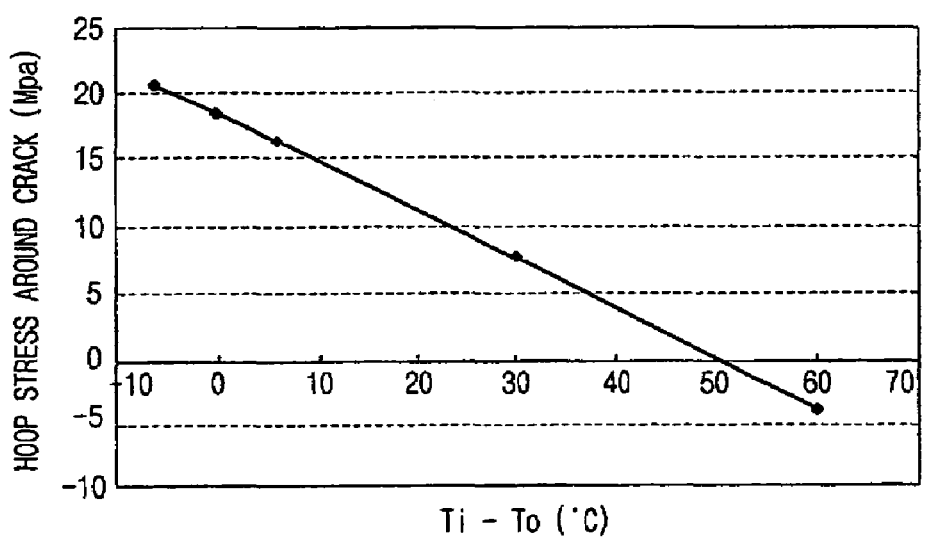
FIG. 7 is a graph for explaining a correlation between a temperature difference between the inner circumferential region of the optical disc and the periphery of the optical disc and a hoop stress.

FIG. 7 is a graph for explaining a correlation between a temperature difference Ti-To between the inner circumference temperature Ti of the optical disc and the peripheral temperature To of the optical disc and a hoop stress.

The initial and boundary conditions of the graph of FIG. 7 are as follows.

In the initial condition, a clamping region is a ring shaped region corresponding to a radius of 10.5 mm-13.5 mm from the center of the optical disc, and a clamping force 250 $g_f$ of a clamper 170 is applied to the optical disc thereby to prevent a separation of the optical disc from a turntable 210 of the optical disc drive.

In the boundary condition, a length of an initial crack of the optical disc Cd (Refer to FIG. 5) is 7.5 mm, and a rotation speed of the optical disc is 10,500 rpm, a rotation condition of the 52-speed optical disc drive. Also, in an insulated condition, the inner circumference temperature of the optical disc is supposed to be Ti, the peripheral temperature of the optical disc is supposed to be To, the To when the optical disc drive is mounted in a personal computer is supposed to be 50° C., and an average temperature of the computer. A diameter of the hole of the optical disc is 15 mm, an outer diameter of the optical disc is 120 mm, a thickness of the optical disc is 1.2 mm, and a material of the optical disc is polycarbonate.

As shown, when the inner circumference temperature Ti of the optical disc is maintained to be less than 100° C., the temperature difference Ti-To between the inner circumference temperature Ti of the optical disc and the peripheral temperature To of the optical disc is less than 50° C., and a hoop stress around a crack is gradually increased. As the hoop stress around the crack is increased, the crack gradually grows thereby to damage the optical disc.

On the other hand, when the inner circumference temperature Ti of the optical disc is maintained as 100° C., the temperature difference Ti–To between the inner circumference temperature Ti of the optical disc and the peripheral temperature To of the optical disc is 0° C., and thereby a hoop stress around a is crack is not generated.

Moreover, when the inner circumference temperature Ti of the optical disc is maintained to be more than 100° C., the temperature difference Ti–To between the inner circumference temperature Ti of the optical disc and the peripheral temperature To of the optical disc is more than 50° C., and a hoop stress around a crack is gradually decreased. As the hoop stress around the crack is gradually decreased, the crack is gradually restrained thereby to effectively prevent the optical disc.

Figure 8:
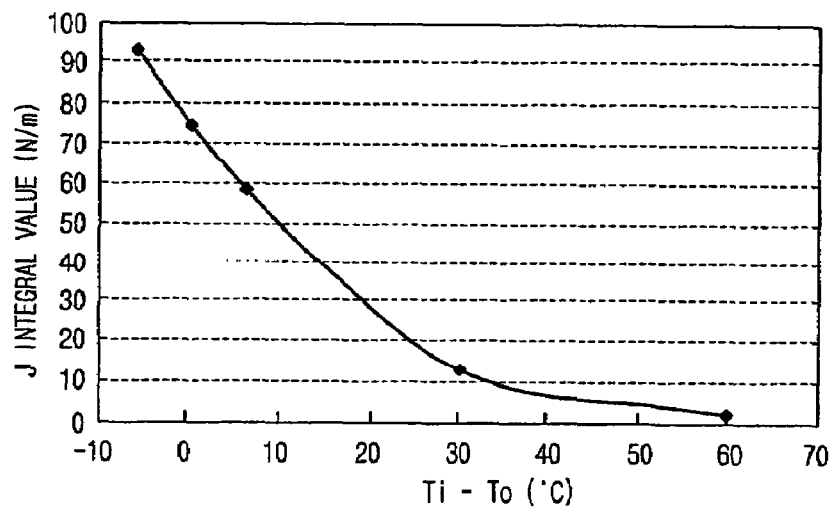
FIG. 8 is a graph for explaining a correlation between a temperature difference between the inner circumferential region of the optical disc and the periphery of the optical disc and a J-integral value.

FIG. 8 is a graph for explaining a correlation between the temperature difference Ti–To between the inner circumference temperature Ti of the optical disc and the peripheral temperature of the optical disc and a J-integral value.

The J-integral value is used as a standard of a crack growth for a non-linear viscosity elastic material in R. A. Schapery's thesis. According to this, a sensitivity for a crack of the optical disc can be quantitatively compared by using the J-integral value.

In FIG. 8, initial and boundary conditions are the same as those of FIG. 7.

As shown in FIG. 8, the lower the J-integral value is, the less the sensitivity for a crack is. According to this, it is advantageous to use a material having a low J-integral value in order to prevent a damage of the optical disc.

That is, the higher the J-integral value is, the higher a possibility that a crack is increased is. The higher the inner circumference temperature Ti is than the peripheral temperature To of the optical disc, the J-integral value becomes lower thereby to reduce a growth of a crack.

In the optical disc drive of the present invention, the inner circumferential region of the optical disc 10 is heated thereby to maintain the inner circumference temperature Ti of the optical disc to be higher than the peripheral temperature To of the optical disc by at least 50° C. According to this, a stress having a negative value is generated at the periphery of a crack, that is, a stress is decreased thereby to effectively restrain a growth of a crack.

Figure 9:
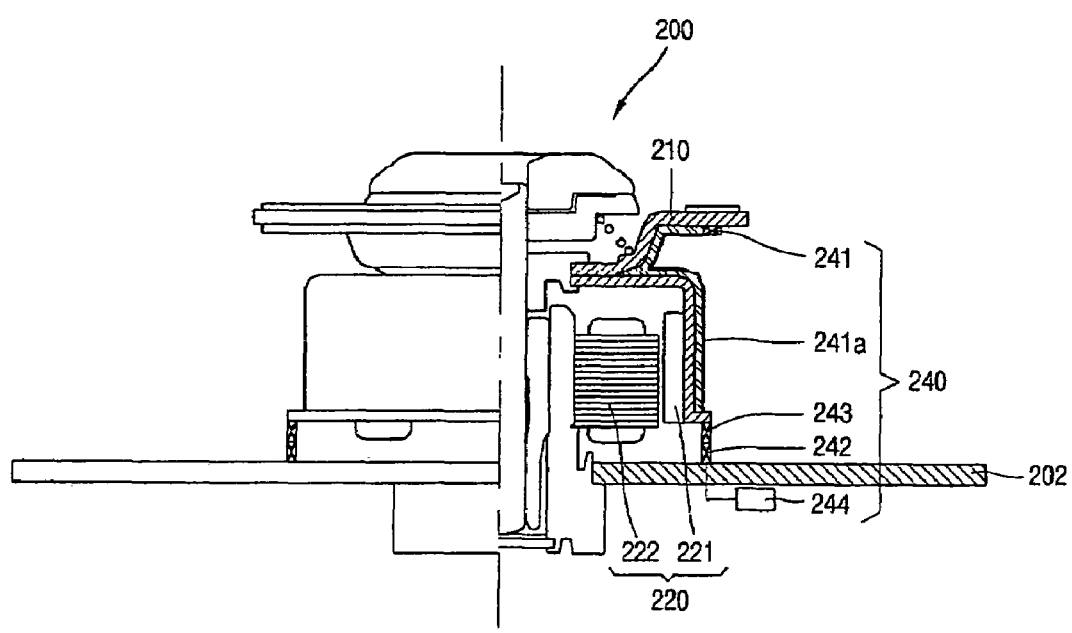
FIG. 9 is a longitudinal section view showing an optical disc drive according to another embodiment of the present invention.

FIG. 9 is a longitudinal section view showing an optical disc drive according to another embodiment of the present invention.

As shown, an optical disc drive 200 according to another embodiment of the present invention comprises: a turntable 210 for mounting an optical disc 10; a driving unit 220 for driving the turntable 210; and an optical disc heating member 240 installed at the turntable 210 and the driving unit 220, for heating an inner circumferential region of the optical disc 10 only when the turntable 210 is rotated.

The optical disc heating member 240 is composed of: a heat wire portion 241 fixed to a lower surface of the turntable 210; a power portion electrode terminal 242 installed at an upper portion of a main base 202; and a rotator electrode terminal 243 installed at a lower portion of a rotator 221 of the driving unit 240 to be selectively in contact with the power portion electrode terminal 242. A wire 241a electrically connects the heat wire portion and the rotation electrode terminal.

The driving unit 220, for example, a spindle motor is composed of a stator 222; and a rotator 221 rotatably installed at a periphery of the stator 222. The rotator electrode terminal 243 is fixed to a lower portion of the rotator 221, and correspondingly, the power portion electrode terminal 242 is fixed to the main frame 202.

At least two rotation electrode terminals 243 and at least two power portion electrode terminals 242 are installed with the same interval, respectively. The rotator electrode terminal 243 is constructed to be electrically connected to the power portion electrode terminal 242 while being rotated together with the rotator 221.

In the optical disc drive 200 according to another embodiment of the present invention, the heat wire portion 241 is heated only when the spindle motor is driven in a replaying mode of the optical disc.

When the rotator 221 of the driving unit 220 is rotated in a driving mode such as the replaying mode of the optical disc, the rotator electrode terminal 243 fixedly installed at a lower portion of the rotator 221 is also rotated.

At this time, the rotator electrode terminal 243 comes in contact with the power portion electrode terminal 242 at a proper position while being rotated, and a current supplied from the power portion 244 flows to the power portion electrode terminal 242, the rotator electrode terminal 243, and the heat wire portion 241. According to this, the heat wire portion 241 is operated thereby to heat the inner circumferential region of the optical disc 10 mounted on the turntable 210.

That is, a power source of the power portion 244 is not always supplied to the heat wire portion 241, but is supplied only when the rotator electrode terminal 243 is in electrically contact with the power portion electrode terminal 242 at a proper position while being rotated by the rotator 221.

In the optical disc drive of the present invention, a stress generated at a periphery of a crack is decreased by maintaining the inner circumference temperature Ti to be higher than the peripheral temperature To by at least 50° C., preferably 50° C.~70° C. According to this, a growth of the crack can be effectively restrained.

Additionally, in the optical disc drive of the present invention, when the optical disc is rotated too fast with at least 52-speed, the rotator electrode terminal 243 faster comes in contact with the power portion electrode terminal 242 fast. According to this, much more current is supplied to the heat wire portion 241, and the heat wire portion 241 supplies heat of a higher temperature to the inner circumferential region of the optical disc 10. According to this, a damage of the optical disc can be effectively prevented even when the optical disc is rotated too fast with at least 52-speed.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An optical disc drive, comprising:
   a turntable configured to detachably mount an optical disc;
   a driving unit comprising a rotator and configured to rotate the turntable;
   a clamper configured to clamp the optical disc and prevent the optical disc from being separated from the turntable when the turntable is rotated; and
   an optical disc heating member disposed adjacent to a center portion of the optical disc and configured to restrain growth of a crack generated at the center portion of the optical disc by heating the center portion of the optical disc only when the turntable is rotated,
   wherein the optical disc heating member comprises:
   a heat wire portion fixed to a lower surface of the turntable;
   a power portion electrode terminal installed at an upper surface of a main chassis;
   a rotator electrode terminal installed at a lower portion of the driving unit rotator and configured to be selectively in contact with the power portion electrode terminal; and
   a power portion connected to the power portion electrode terminal.

2. The optical disc drive of claim 1, wherein the center portion of the optical disc is an inner circumferential region where a recording film is not formed.

3. The optical disc drive of claim 2, wherein the inner circumferential region is a region less than a diameter of 34 mm from the center of the optical disc.

4. The optical disc drive of claim 1, wherein the optical disc heating member is configured to maintain a temperature difference between an inner circumferential region and a peripheral region of the optical disc to be at least 50° C.

5. The optical disc drive of claim 4, wherein the optical disc heating member is further configured to maintain the temperature difference between the inner circumferential region of the optical disc and the peripheral region of the optical disc to be approximately 50° C.~70° C.

6. An optical disc drive, comprising:
   a turntable configured to detachably mount an optical disc;
   a driving unit comprising a rotator and configured to rotate the turntable;
   a clamper configured to clamp the optical disc and prevent the optical disc from being separated from the turntable when the turntable is rotated; and
   an optical disc heating member disposed adjacent to an inner circumferential region of the optical disc and configured to restrain growth of a crack generated at a center portion of the optical disc by heating the inner circumferential region of the optical disc,
   wherein the optical disc heating member heats the inner circumferential region of the optical disc only when the turntable is rotated,
   wherein the optical disc heating member comprises:
   a heat wire portion fixed to a lower surface of the turntable;
   a power portion electrode terminal installed at an upper surface of a main chassis;
   a rotator electrode terminal installed at a lower portion of the driving unit rotator and configured to be selectively in contact with the power portion electrode terminal; and
   a power portion connected to the power portion electrode terminal.

7. The optical disc drive of claim 6, wherein a power source of the power portion is supplied to the heat wire portion via the power portion electrode terminal and the rotator electrode terminal when the rotator electrode terminal is in contact with the power portion electrode terminal.

8. The optical disc drive of claim 6, wherein the optical disc heating member heats the optical disc according to a rotation speed of the optical disc.

9. The optical disc drive of claim 6, wherein the inner circumferential region of the optical disc is a region less than a diameter of 34 mm from the center of the optical disc.

* * * * *